US011379232B2

(12) United States Patent
Schlegel et al.

(10) Patent No.: US 11,379,232 B2
(45) Date of Patent: Jul. 5, 2022

(54) METHOD FOR GENERIC VECTORIZED D-HEAPS

(71) Applicant: Oracle International Corporation, Redwood Shores, CA (US)

(72) Inventors: Benjamin Schlegel, Merced, CA (US); Harshard Kasture, Sunnyvale, CA (US); Pit Fender, Union City, CA (US); Matthias Brantner, Sunnyvale, CA (US); Hassan Chafi, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 633 days.

(21) Appl. No.: 16/399,226

(22) Filed: Apr. 30, 2019

(65) Prior Publication Data
US 2020/0348933 A1    Nov. 5, 2020

(51) Int. Cl.
*G06F 9/30* (2018.01)
*G06F 9/38* (2018.01)
*G06F 16/901* (2019.01)

(52) U.S. Cl.
CPC ........ *G06F 9/30036* (2013.01); *G06F 9/3887* (2013.01); *G06F 16/9027* (2019.01)

(58) Field of Classification Search
None
See application file for complete search history.

(56) References Cited

U.S. PATENT DOCUMENTS

2021/0294603 A1    9/2021   Kasture et al.

OTHER PUBLICATIONS

Furtak, Timothy, José Nelson Amaral, and Robert Niewiadomski. "Using SIMD registers and instructions to enable instruction-level parallelism in sorting algorithms." Proceedings of the nineteenth annual ACM symposium on Parallel algorithms and architectures. 2007. pp. 348-357. (Year: 2007).*

Furtak, Timothy Michael. "Sorting Using SIMD Registers." (2007). (Year: 2007).*

Liu, Weifeng, and Brian Vinter. "Ad-heap: An efficient heap data structure for asymmetric multicore processors." Proceedings of Workshop on General Purpose Processing Using GPUs. 2014. pp. 54-63. (Year: 2014).*

(Continued)

*Primary Examiner* — Tony Mahmoudi
*Assistant Examiner* — Umar Mian
(74) *Attorney, Agent, or Firm* — Hickman Becker Bingham Ledesma LLP (57) ABSTRACT

Techniques are provided for obtaining generic vectorized d-heaps for any data type for which horizontal aggregation SIMD instructions are not available, including primitive as well as complex data types. A generic vectorized d-heap comprises a prefix heap and a plurality of suffix heaps. Each suffix heap of the plurality of suffix heaps comprises a d-heap. A plurality of key values stored in the heap are split into key prefix values and key suffix values. Key prefix values are stored in the prefix heap and key suffix values are stored in the plurality of suffix heaps. Each entry in the prefix heap includes a key prefix value of the plurality of key values and a reference to the suffix heap of the plurality of suffix heaps that includes all key suffix values of the plurality of key values that share the respective key prefix value.

18 Claims, 6 Drawing Sheets

(56) References Cited

OTHER PUBLICATIONS

Adams, Stephen. "Exploration Into the Performance of Asymmetric D-Ary Heap-Based Algorithms for the Hsa Architecture." (2014). (Year: 2014).*

Garcia-Vazquez, César A., and Carlos A. Lopez-Andrade. "D-Heaps as hash tables for vectors over a finite ring." 2009 WRI World Congress on Computer Science and Information Engineering. vol. 3. IEEE, 2009. pp. 162-166. (Year: 2009).*

Knuth et al. "The Art of Computer Programming", Volume 3: (2Nd Ed.) Sorting and Searching, AddisonWesley Longman Publishing Co., Inc., Redwood City, CA, USA, dated 1998, 1061 pages.

Edelkamp, et al., "Strengthened Lazy Heaps: Sur-passing the Lower Bounds for Binary Heaps", dated 2014. 14 pages.

Chowdhury et al. "Cache-oblivious Shortest Paths in Graphs Using Buffer Heap". Dated Jun. 2004, 11 pages.

Arge et al. "The Buffer Tree: A New Technique for Optimal i/o-algorithms", In Data Structures, dated Aug. 1996, 37 pages.

\* cited by examiner

METHOD FOR GENERIC VECTORIZED D-HEAPS

FIELD OF THE INVENTION

The present disclosure relates to maintaining data structures and, more particularly, aggregation, storing, and removal of data in data structures.

BACKGROUND

A heap is a priority queue data structure containing nodes that have two child nodes holding a single value generally reflected via a tree structure. The key features of this data structure are the adding/removing of a single element in logarithmic time and the ability to find the smallest/largest element of the heap's indexed elements in constant time. The most common types of heaps are min-heaps, which always return the smallest indexed element in the heap, and max-heaps, which always return the largest indexed element in the heap.

Many heaps are so large that a significant fraction of the runtime of the algorithm using the heap (e.g. graph algorithms) is spent on heap operations. Hence, there is a need for efficient heap implementations.

The d-heap is a generalization of a binary heap that has as many child nodes as defined by the value of d which contain an amount of values defined by the value of d. D-heaps use a tree to index elements. D-heaps are the optimal data structure for fast insert operations since the additional child nodes decrease the depth of the underlying tree and result in fewer comparisons needed to restore the heap property when a new value is inserted into the heap.

Vectorized d-heaps that utilize horizontal aggregation SIMD instructions can achieve superior performance compared to binary heaps and regular d-heaps. However, modern processors have only limited support for horizontal aggregation SIMD instructions. For example, the PHMINPOSUW instruction, which finds the smallest of eight 16-bit unsigned integer values, is the only horizontal aggregation SIMD instruction supported by current x86 processors.

Thus, techniques are desired for vectorized d-heaps to support arbitrary native and complex data types even when there is only limited availability of horizontal aggregation SIMD instructions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for obtaining generic vectorized d-heaps for any data type including primitive as well as complex data types. D-heaps can be vectorized and utilize horizontal aggregation SIMD instructions across the retrieval operations to minimize the number of comparisons needed for retrieval operations. Vectorized d-heaps are fully described in U.S. patent application Ser. No. 16/139226, filed Sep. 24, 2018, the entire contents of which are hereby incorporated by reference as if fully set forth herein.

As an improvement of a vectorized d-heap, a generic vectorized d-heap comprises a prefix heap and a plurality of suffix heaps stored in a memory. Each suffix heap of the plurality of suffix heaps comprises a d-heap, which may be vectorized. Each key value of a plurality of key values is split into a key prefix value and a key suffix value. Key prefix values are stored in the prefix heap and key suffix values are stored in the plurality of suffix heaps. Each entry in the prefix heap includes a key prefix value of the plurality of key values and a reference to the suffix heap of the plurality of suffix heaps that includes all key suffix values of the plurality of key values that share the respective key prefix value. A prefix hash-table may be utilized to quickly obtain suffix d-heaps for a given prefix value.

Heap operations such as top, pop, and push are each split into steps including operating on the prefix heap and operating on the suffix heap. Using such generic vectorized d-heaps, arbitrary primitive data types such as integer or floating point that are not natively supported by available horizontal aggregation SIMD instructions can be indexed in the generic vectorized d-heap and benefit of the superior performance of vectorized d-heaps.

D-Heap Overview

As described herein, a d-heap is a priority queue data structure containing an array of items that may be viewed as the nodes in a complete d-ary tree. As opposed to binary heaps, d-heaps typically run faster for heap sizes that exceed the size of the computer's cache memory because they result in less cache misses and virtual memory page faults than binary heaps.

D-heaps are implemented via any programming language that utilizes container data structures including JAVA, C++, OBJECTIVE-C or any other suitable programming environment.

As described herein, a d-heap is a priority queue data structure which contains a plurality of nodes in a tree structure wherein each node contains d values and has up to d successors/children. The plurality of nodes includes parent nodes and children nodes containing D slots wherein each of the D slots store a key value of D.

In one embodiment, the d-heap is contiguously stored in a memory array having slot elements containing a beginning-most space and end-most space. The plurality of nodes of the d-heap comprise D slots, D being a whole number greater than one, wherein each of the D slots store a key value, wherein the D slots are stored contiguously within a memory address space of the memory. Each parent node has D child nodes, and each child node is a child of a respective parent slot that stores a key value greater than any key value stored in the respective parent slot. A pop operation is performed on the d-heap by performing a SIMD operation on the root node to generate a first minimum key value and a first index of the first slot in the root node, which is a parent slot of a child slot, that holds the first minimum key value. The end-most value in the d-heap is copied into the first slot in the root node and a SIMD operation is performed on a child node of the root node to generate a second minimum key value and a second index in a slot of the child node that contains the second minimum key value. If the second minimum key value is less than the first minimum key value, then the key values are swapped.

In one embodiment, a heap comprising a root level of nodes and one or more non-root level of nodes is stored in the memory array. Each element of the array holds a node of the d-heap wherein the root node is stored in the beginning-most element of the array and the non-root levels are contiguously stored immediately after the root node in respective contiguous array elements. The D slots of the root-node are stored in the beginning-most space of the array and each D-slot of the non-root levels is stored contiguously in elements of the array immediately after D-slots of the root node are stored.

In one embodiment, a heap is stored in an array in a memory that comprises a plurality of heap levels, which, after the first heap level, stores contiguously with an address space of the memory for each particular heap level all child nodes of each previous heap level. As described herein, heap levels are a mechanism to organize elements of a heap and are defined by their distance from the root node. The root node forms heap level 0 where the root node is the only node, the children of the root node form heap level 1, and each subsequent level contains the child nodes of each respective parent node.

Figure 1:
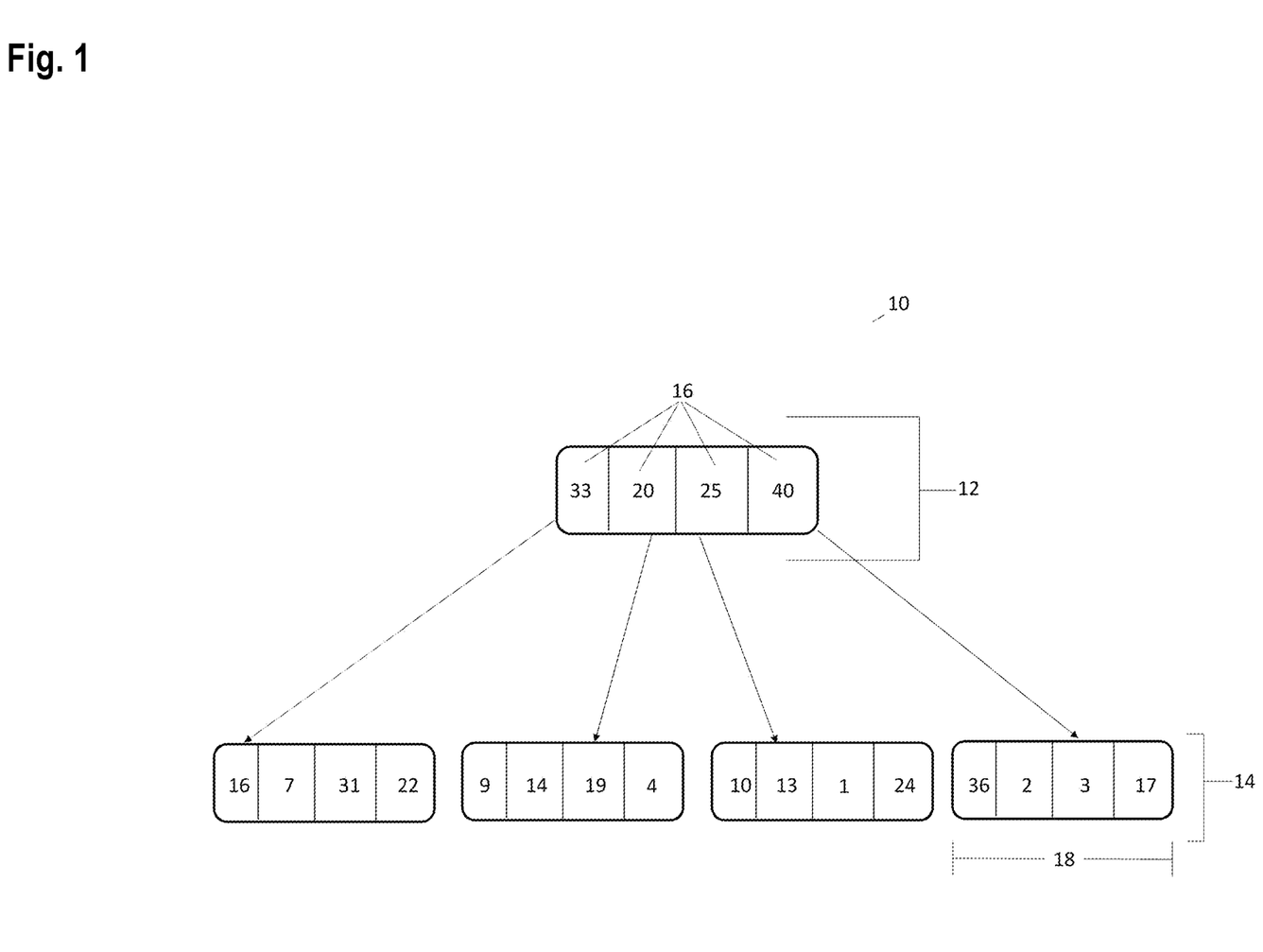
FIG. 1 is a diagram depicting a d-heap according to an embodiment of the present invention.

For the purpose of illustrating a clear example, FIG. 1 illustrates d-heap 10 containing only 2 heap levels: a root level 12 and a non-root level 14. Other embodiments may implement any number of heap levels containing D child nodes comprising D slots in each heap level except for the first heap level containing the root node.

SIMD Overview

Single Instruction, Multiple Data (SIMD) architectures exist to allow computers with multiple processing elements to simultaneously perform the same operation on multiple data points. SIMD architectures may perform mainly "vertical" operations where corresponding elements in separate operands are operated upon in parallel and independently.

Unlike traditional vertical SIMD instructions, horizontal SIMD instructions are performed across the elements of a SIMD register. Horizontal aggregation SIMD instructions possess a subclass of horizontal aggregation SIMD instructions that aggregate the values of a single vector allowing the maximum and minimum key value in a register to be located.

SIMD instructions allow the execution alignment of the same operation on multiple data elements at once. In one embodiment, the key values stored in the D-slots of the heap are vectorized and aligned so that horizontal SIMD instructions are applied on the plurality of nodes in order to perform retrieval operations to find the minimum and maximum value within a node of the heap.

Vectorizing D-Heaps Using Horizontal Aggregation SIMD Instructions

In the d-heap being contiguously stored across the array of slots of the memory, the key values stored in the D slots of the nodes are contiguously in memory and control dependencies can be minimized for the many comparisons needed for the retrieval operations on the d-heap, thus increasing the speed of the operations.

Modern microprocessors and computer architectures, such as SSE4.1, are configured to execute media instructions that include identifying a horizontal minimum set of digital values and corresponding locations in a register. For example, the PHMINPOSUW instruction uses an array of 16-bit magnitude comparators to aggregate values into a vector using a minimum function and finds the value and position of the smallest vector value. The instruction further sets the bottom unsigned 16-bit value of the destination to the smallest unsigned 16-bit value in the source, and the next-from-bottom to the index of that word in the source. Such instruction was introduced as part of Intel SSE4.1 and is available in all modern x86 processors.

Although PHMINPOSUW is currently the only horizontal aggregation SIMD instruction, min-heaps and max heaps for various data types can still be obtained despite this current limitation.

An improvement caused by the approach of using Horizontal Aggregation SIMD instructions on d-heap retrieval operations includes less cache lines needed to be retrieved to read a single element from a d-heap, more efficient memory management strategy for growing and shrinking of vectorized d d-heaps, and less comparisons performed in order to find the maximum or minimum key value within a single node of a d-heap.

D-Heap Implementation Overview

FIG. 1 is a diagram depicting an example d-heap 10, where the value of D is four, in an embodiment. D-heap 10 includes a plurality of nodes in a tree structure including a plurality of parent nodes at root level 12 and a plurality of children nodes at root level 14. Each node contains D slots and a plurality of key values 16 where each D slot stores D key values. Parent nodes in root level 12 contain a root node and each parent node has one or more child nodes being a child of a respective parent slot. While only two levels 12-14 are depicted, d-heap 10 may support many more non-root levels. Also, while FIG. 1 depicts plurality of key fields 16 containing integers, d-heap 10 supports various primitive types of data including but not limited to signed integers, unsigned integers, single-precision floating point, etc. In the case of unsigned integers, the signed bit is switched whenever a key value is inserted/pushed into a signed integer vectorized heap and the signed bit is switched back when the signed bit is retrieved from the heap. As a result, negative key values are returned before positive key values yielding the correct result of unsigned comparison instructions.

Figure 2:
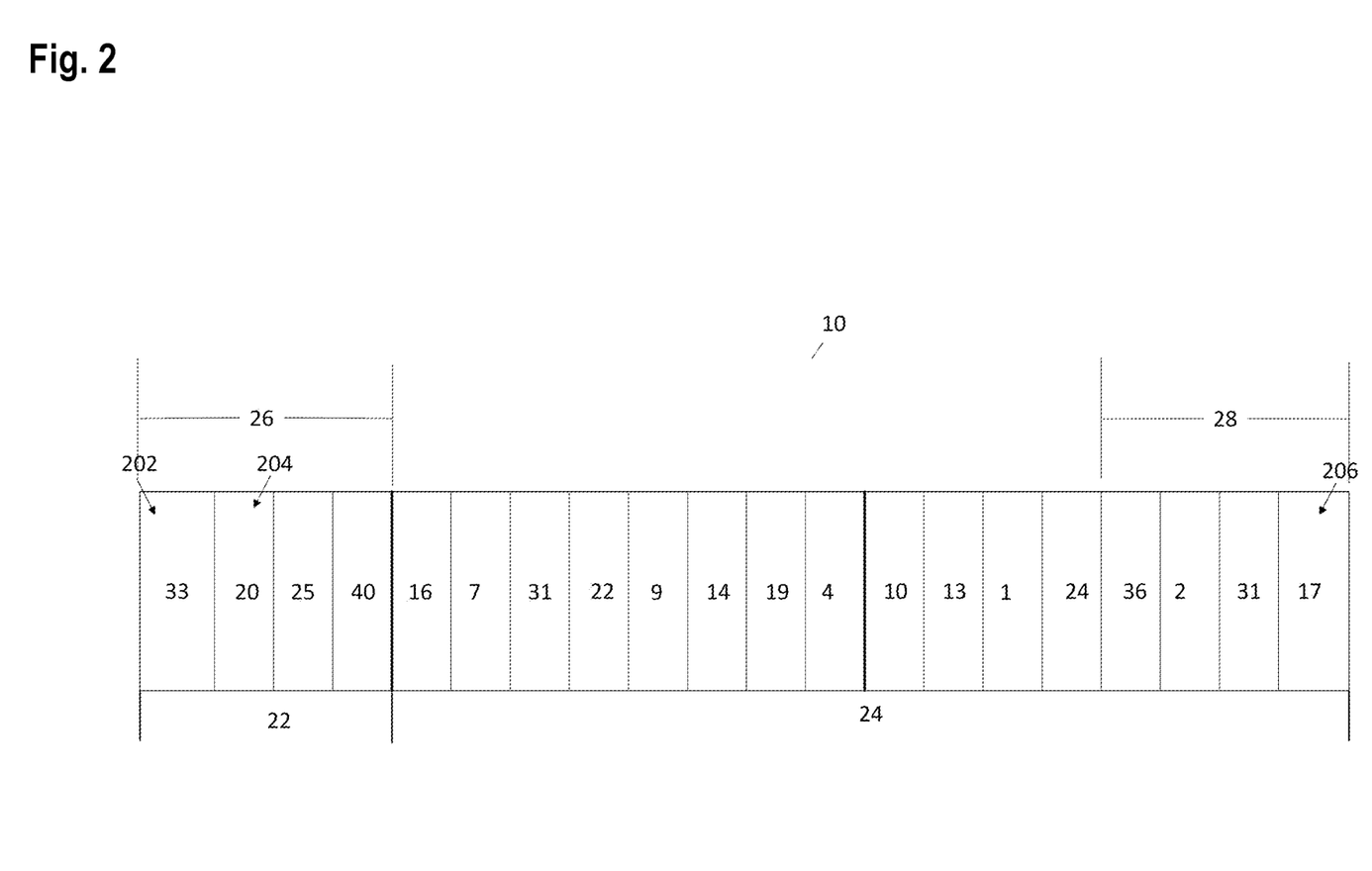
FIG. 2 is a diagram depicting a linearized vectorized d-heap according to an embodiment of the present invention.

In one embodiment, d-heap 10 is configured to be stored in an array of slots in a contiguous memory where each slot is an element of the array. The array is configured to allocate additional memory for adding and storing key values, and each element of the array may correspond to one respective slot of the nodes of d-heap 10. FIG. 2 is a diagram that depicts d-heap 10 vectorized in which each key value in the D slots of the root node at root level 12 is stored contiguously in contiguous space 22 and each key value in the D slots of non-root level 14 are stored contiguously in contiguous space 24 immediately after storing the key values of the root node in contiguous space 22; thus, vectorizing d-heap 10 wherein the four key values within the first four slots of the root node in root level 12 fill beginning-most array of slots 26 and the key values within the D slots of the nodes of non-root level 14 fill remaining slots 28. In an embodiment, key values of parent nodes are stored contiguously in a first set of slot elements of an array of memory followed by contiguously storing key values of child nodes in a second set of slot elements of the array of memory. The discussed process of filling slots of the array continues until the key values of each node of d-heap 10 fills a slot of the array; thus, forming a beginning-most side and an end-most side. For example, if a slot of the root node contains the key value of 20 then the key value 20 is stored within beginning-most slot 202 of contiguous space 22 while the key field value of end-most child node 18 of non-root level 14 is stored within end-most slot 206 of contiguous space 24.

D-Heap Payload Implementation

According to an embodiment, a heap is stored in conjunction with a payload array. The payload array is aligned with the array of the heap ("heap array"). That is, the first slot of payload array stores a payload for the first slot in the heap array, the second slot of the payload array stores a payload for the second slot in the heap array, and so forth. According to an embodiment, a slot in a payload array stores a pointer to a memory address storing payload data.

The payload array is maintained so that alignment between the payload array and heap array are maintained. Thus, when a key value is swapped between a parent slot and child slot in a child node of the parent slot, in the payload array, the respective slot of the parent slot is swapped with the respective slot in the child slot.

D-Heap Pointer Implementation

In an embodiment, a d-heap is represented using a pointer-based representation. Each node comprises D slots for key values ("key value slots") and D slots for pointers ("pointer slots"). The key value slots and pointer slots are stored contiguously within memory address space, with the key value slots being stored contiguously within an address space of memory so that the key value slots may be loaded into memory as a cache line or contiguous portion of a cache line.

Each key value slot corresponds to a respective pointer slot stored at an offset based on the address of the key value slot. The pointer stored in the respective pointer slot points to a child node.

A pop operation for a pointer-based representation comprises at least the following. For a given key value stored in a parent slot in a parent node, the child node is traversed to by using the pointer stored at the respective pointer slot in the parent node of the parent slot. The key values stored in the key value slots of the child node are loaded into the SIMD register. A SIMD operation is performed to generate a minimum key value among the key values the index thereof. The minimum key value is then compared to the give key value in parent slot. If the minimum key value is less than the key value in the parent slot, the key values are swapped between child slot identified by the index and parent slot, and so forth.

Generic Prefix with Vectorized Suffix D-Heaps

The generic vectorized d-heap includes an additional layer built around the above discussed vectorized d-heap to enable support for arbitrary and complex data types. The core data structure of a generic vectorized d-heap is the vectorized d-heap. Each key value pushed into a generic vectorized d-heap is split into a prefix value and a suffix value. Suffix values of key values have a length of 16-bits and are maintained in vectorized d-heaps, referred to herein as suffix d-heaps. The suffix value of each key value is assigned to exactly one suffix d-heap. Prefix values are kept in a prefix heap in which each prefix value has a reference to a corresponding suffix d-heap. In some embodiments, the reference comprises a pointer to a memory address storing the respective suffix heap.

A prefix heap orders all prefix values using a given priority function, which defines whether a max-heap or min-heap is used. A prefix heap is used to quickly obtain the prefix values in order of priority, i.e., ascending values for min-heap property and descending values for max-heap property. Each entry in a prefix heap consists of a prefix value and a reference to the suffix d-heap that contains all suffix values of the key values that share the respective prefix value. A prefix heap may be implemented via a C++ stl priority queue but can be implemented via any other priority queue implementation.

Each suffix d-heap hold the suffix values of the key values stored in the generic vectorized d-heap. Suffix d-heaps are used to quickly obtain suffix values in order of priority. A single suffix d-heap contains all suffix values of key values that share the same prefix value. Suffix d-heaps may be implemented using a vectorized d-heap. The number of suffix d-heaps depends on the number of unique prefix values for all key values indexed in the generic vectorized d-heap. Thus, there is one suffix d-heap for each prefix value.

A prefix hash table may be used to index the prefix values of all key values that are stored in a generic vectorized d-heap. A prefix hash table may be used to quickly obtain the suffix d-heap for a given key that is being pushed to the generic vectorized d-heap. In some embodiments, a prefix hash table is stored in a memory. The prefix hash table may include a key prefix value for each suffix heap of a plurality of suffix heaps. Each key prefix value stored in the prefix hash table references a respective suffix heap of said plurality of suffix heaps through a hash function. In an embodiment, a C++ standard template library 'unordered map' is used to implement prefix hash tables where the key value being hashed is the prefix value and the prefix value, through a hash function, includes reference to a suffix d-heap.

Figure 3:
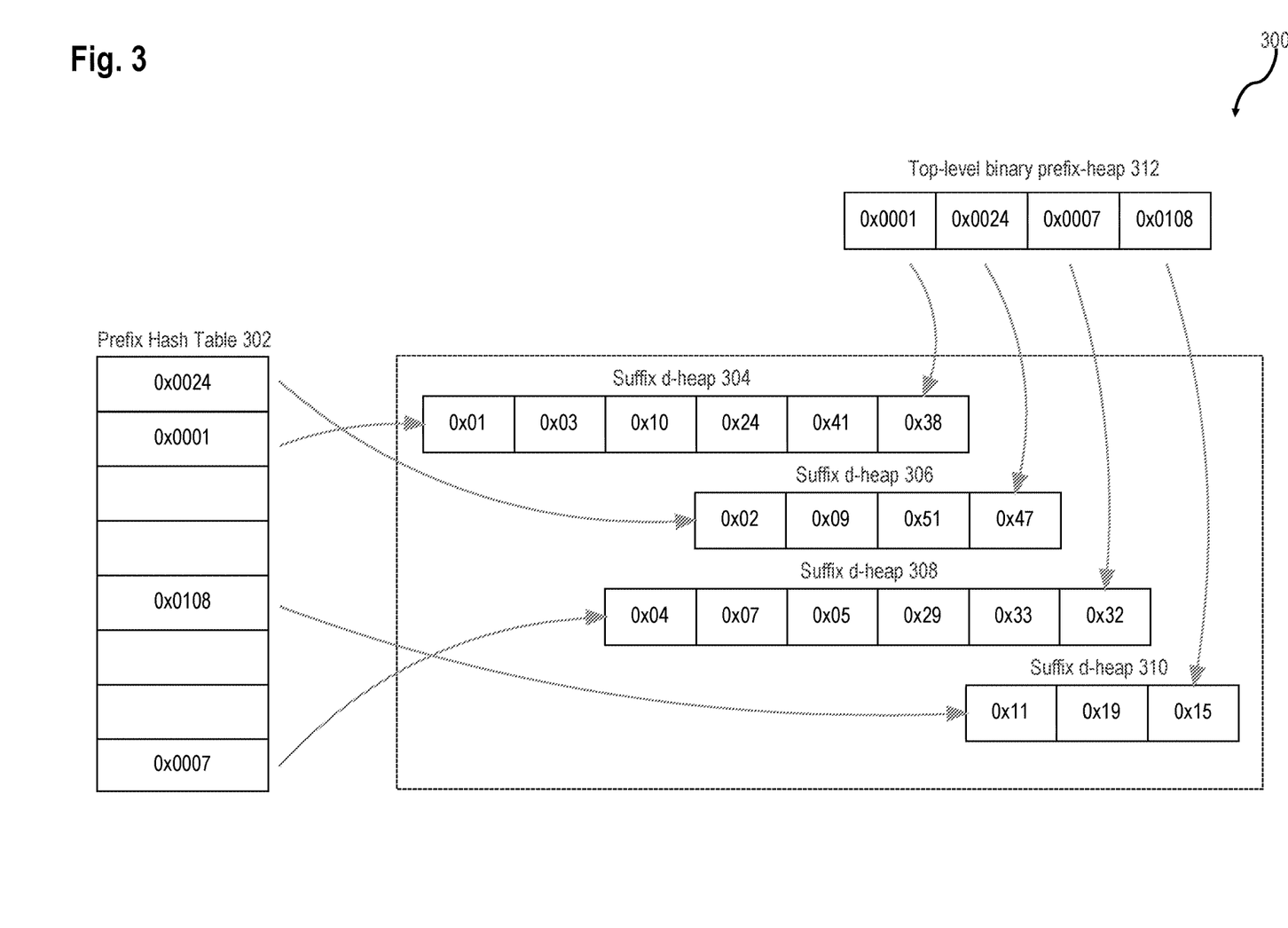
FIG. 3 is a diagram that illustrates the components of a generic vectorized heap that has four suffix d-heaps.

FIG. 3 illustrates the components of a generic vectorized heap 300 that has four suffix d-heaps. In this example, the prefix length is set to 2 bytes while the suffix length is set to one byte for illustration purposes. All values are represented as hexadecimal numbers, i.e., each value starts with 0x followed by either two or four numbers that represent one or two bytes, respectively. The prefix hash table 302 has 8 entries of which four are actually used since there are four suffix d-heaps. The internals of the prefix hash table 302 (number of empty entries, collision handling, etc.) solely depend on the implementation of the prefix hash table 302 in the standard library and are not controlled by the generic vectorized d-heap.

There are in total 19 key values indexed in the generic vectorized heap 300. Key values 0x000101, 0x000103, 0x000110, 0x000124, 0x000141, and 0x000138 share a prefix 0x0001 and thus the key values' respective suffix values are stored in the same suffix d-heap 304. Similarly, the key values 0x010811, 0x010819, and 0x010815 share a prefix 0x0108 and the suffix values of the key values are stored in the same suffix d-heap 310. Each suffix d-heap 304, 306, 308, 310 can be accessed either from the prefix hash table 302 or top-level binary prefix-heap 312. The prefix values stored in the top-level binary prefix-heap 312 as well as the suffix values stored in each suffix d-heap 304, 306, 308, 310 are ordered in a way that they fulfill the heap property. In this particular example, the suffix d-heaps 304, 306, 308, 310 form min-heaps. Each heap used within the generic vectorized d-heap 300 including the prefix heap 312 as well as all suffix d-heaps 304, 306, 308, 310, have their own continuous memory area, which holds prefix values (i.e., in the prefix heap 312) or suffix values (i.e., in the suffix d-heaps 304, 306, 308, 310) and grows and shrinks independently of the other heaps.

Generic Vectorized D-Heap Operations

The 'top' operation internally calls top twice: once on the prefix heap and once on the top suffix d-heap. More specifically, the top operation uses the prefix heap to obtain the top suffix d-heap and a corresponding prefix value (i.e., the smallest value for a min heap and largest value for a max heap). Calling top on the prefix heap returns a tuple, which consists of a prefix value and a reference to the suffix d-heap that holds all suffix values for the respective prefix value. Using the reference to the suffix d-heap, the top operation is called on the suffix d-heap. Finally, the prefix value and the top suffix value returned from the suffix d-heap are concatenated via a bitwise OR operation and the concatenated value is returned.

The 'pop' operation functions similarly to the top operation. When called, the operation first obtains a tuple consisting of a prefix value and reference to the top suffix d-heap by calling top on the prefix heap. The method then calls the pop operation on the top suffix d-heap using the reference and causes the top element in the top suffix d-heap to be removed. If the suffix d-heap is now empty, then there are no other key values that share the respective prefix value. Therefore, the subtree for the prefix value is deleted and references to the subtree in the prefix heap and prefix hash table are removed. In all other cases, there are still key values that include the respective prefix value and thus the entries for the respective prefix value are kept in the prefix heap and prefix hash table. Lastly, the counter that stores the number of keys that are in the generic vectorized heap is decreased to complete the pop operation.

The 'push' operation first extracts a prefix value from a key value by masking the suffix bits away using a pre-initialized variable prefix mask. Similarly, the suffix value is obtained from the key value by masking the prefix bits away using a pre-initialized variable suffix mask. It is then determined if there exists a suffix d-heap for the prefix value via the prefix hash-table. If there is a suffix d-heap for the prefix value already, then the push operation is called on the suffix d-heap to insert the suffix value of the key value into the respective suffix d-heap. Otherwise, a new suffix d-heap is created, the suffix value is pushed into the new suffix d-heap, and a reference of the newly created suffix d-heap is added into the respective prefix heap and prefix hash-table. Lastly, the counter that stores the number of keys that are in the generic vectorized heap in increased to complete the push operation.

The time complexity of the above operations is the same as for the binary heap, i.e., O(log n) for push and pop operations where n is the number of key values in the heap, and O(1) for top( ). Nevertheless, the generic vectorized d-heap has a much lower constant when compared to regular heap implementations such as the binary heap. Depending on the key distribution, the number of levels that are traversed during a pop or push operation are lower than for a binary heap. Since the keys are partitioned via prefixes into multiple suffix d-heaps, the number of levels per suffix d-heap is much lower than the number of levels in a binary heap that holds all keys. The reduction of levels being traversed during an operation comes additionally to the reduced number of levels achieved by the vectorized d-heap. For example, a binary heap has 20 levels when 1000 key values are indexed. The generic vectorized heap has only 2 levels if the 1000 key values are distributed over 16 suffix d-heaps, assuming a uniform distribution of the keys over the suffix d-heaps. Each suffix d-heap would contain the suffixes of about 60 keys leading to a 2-level suffix d-heap for d=8. The result is a 10× reduction in number of levels that need to be traversed during pop or push operation.

Procedure Overview

Figure 4:
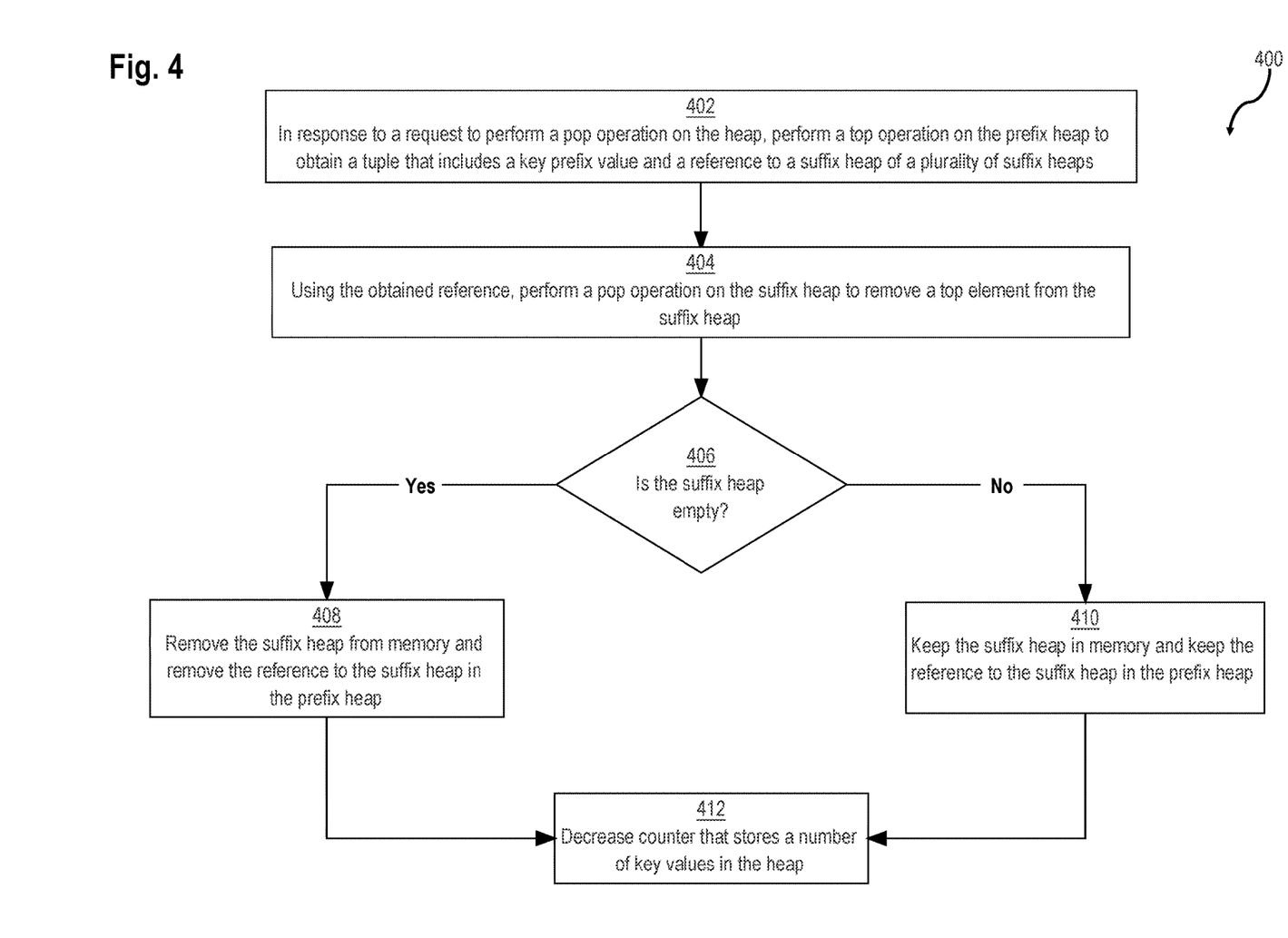
FIG. 4 is a flow chart that depicts a process for performing a pop operation on a generic vectorized d-heap.

FIG. 4 is a flow diagram that depicts a flow 400 for performing a pop operation on a generic vectorized d-heap. A generic vectorized d-heap includes a heap stored in a memory. The heap comprises a prefix heap and a plurality of suffix heaps. Each suffix heap of the plurality of suffix heaps comprises a d-heap. A plurality of key values stored in the heap are split into key prefix values and key suffix values. Key prefix values are stored in the prefix heap and key suffix values are stored in the plurality of suffix heaps. Each entry in the prefix heap includes a key prefix value of the plurality of key values and a reference to the suffix heap of the plurality of suffix heaps that includes all key suffix values of the plurality of key values that share the respective key prefix value.

Flow 400 may be performed in any modern x86 processors containing Streaming SIMD Extensions (SSE). The x86 processor architecture allows the instructions to operate on an independent register set including registers, which contain eight 16-bit values being compared.

At block 402, in response to a request to perform a pop operation on the heap, a top operation is performed on the prefix heap. The top operation obtains a tuple from the prefix heap that includes a key prefix value and a reference to a suffix heap of the plurality of suffix heaps. In some embodiments, the reference comprises a pointer to a memory location where the suffix heap is stored. The reference to the suffix heap refers to the suffix heap that includes all key suffix values of the plurality of key values that share the respective key prefix value.

At block 404, using the reference obtained in step 402, a pop operation is performed on the suffix heap. The pop operation removes the top element, i.e. the min or max key suffix value, from the suffix heap.

In some embodiments, removing a min or max key suffix value from the suffix heap includes performing a SIMD operation on a root node of the suffix heap to generate a minimum key suffix value and a first index of a first slot in the root node that holds the first minimum key suffix value. Then, a value in the suffix heap is copied into the first slot to maintain the heap property. Performing operations such as top and pop on vectorized d-heap implementations, i.e. suffix heaps, is further discussed in U.S. patent application Ser. No. 16/139226, filed Sep. 24, 2018, the entire contents of which are hereby incorporated by reference as if fully set forth herein.

At block 406, a determination is made as to whether the suffix heap is empty. If the suffix heap is empty, i.e. there are no other key suffix values in the suffix heap that share the key prefix value, then block 408 occurs where the suffix heap is removed from memory and the reference to the suffix heap in the prefix heap is removed using a pop operation. If the suffix heap is not empty, i.e. there are still key suffix values that share the key prefix value, then block 410 occurs where the suffix heap is kept and the reference to the suffix heap in the prefix heap is kept.

At block 412, a counter that stores a number of key values in the heap is decreased.

Memory-Efficient Key Representation

Splitting up key values into prefix values and suffix values and storing the prefix values separately from the suffix values significantly reduces the memory footprint of the generic vectorized d-heap when compared to a regular heap. A prefix value that is shared by multiple key values is stored only twice-once in the prefix hash table and once in the prefix heap, while only one suffix value is stored per key value. Thus, the memory required per prefix value is shared among all key values that share the prefix value and the overall memory required per single key value approaches the memory required for a single suffix value.

For example, if 100 8-byte key values that are split up in a 6-byte prefix value and a 2-byte suffix value all share the same prefix value, then about 32 bytes are required to store the prefix value in the prefix hash table and the prefix heap and 200 bytes are required for storing the suffix values. Hence, the average memory required per key is 232/100=2.32 bytes instead of 8 bytes if the key values are stored directly. The actual memory improvements depend on the length of the prefix values and suffix values, the key distribution, and the key values' data type.

Having shorter suffix values leads to greater improvements since, as mentioned previously, the average memory required per key value approaches the number of bytes required per suffix value. Having larger suffix values allows more key values to share a prefix value which is imperative for a low memory footprint per key.

Having 16-bit suffixes allows up to 65,536 key values to share a prefix value and the memory footprint approaches 2 bytes per key. Horizontal aggregation SIMD instructions only support 16-bit values which disallows using any other suffix value length using this implementation. Since the key values' average memory footprint will approach 2 bytes, the memory savings are larger for larger data types, i.e., 4-byte data types could be reduced to at best one-half of their size while 8-byte data types could be reduced to one-quarter of their size.

Min and Max Heap Semantics

The generic vectorized d-heap supports both min-heap and max-heap semantics. In both cases, the semantics of the prefix heap as well as all suffix d-heaps must match. To obtain a min-heap, the prefix heap and all suffix d-heaps in a generic vectorized d-heap must have min-heap semantics. To obtain a max-heap, the prefix heap and all suffix d-heaps in the generic vectorized d-heap must have max-heap semantics.

Supporting Primitive Data Types

Support for integer data types using a generic vectorized d-heap is straightforward. The integer values are based on their width and are split into a n-bit prefix value and a 16-bit suffix value where n+16 is the bit width of the integer, e.g., n=16 for a 32-bit integer. Only the prefix heap needs to be aware of the signedness, i.e., whether unsigned or signed integers are used. Since the sign bit is part of a prefix value, the suffix d-heaps index stores unsigned 16-bit suffix values for both signed and unsigned integer key values.

Floating point data types are handled similarly as integer data types. Floating point values are split up in an n-bit prefix and 16-bit suffix where n+16 is the bit width of the floating point value. Hence, the exponent and the upper part of the mantissa are used as a prefix value while the lower part of the mantissa is used as a suffix value. Prefix values are treated as floating point values, i.e., the prefix heap uses floating point as the type, while the suffix values are treated as integer values. As done for integer values, prefix values and suffix values are concatenated to obtain the floating value when the top operation is called. The special cases of 'infinity' and 'not-a-number' are handled by the prefix tree implementation, e.g., throwing exceptions for 'not-a-number' values.

Generic Vectorized D-Heap Payloads

Payloads are stored separately from key values in a second array in each suffix d-heap. These payload arrays grow and shrink similarly to the arrays used to store the suffix values in the suffix d-heaps. Each suffix value, and thus each key value, has one entry assigned in a payload array. Hereby, a suffix value stored at position i in the heap array has a respective payload stored at position i in the payload array. Whenever a suffix value is moved in the heap array during push or pop operation, the respective payload is moved in the payload array. The payload arrays either hold the payloads directly (for primitive datatype payloads) or hold a pointer to the payload (for complex datatype payloads).

Memory Management

Similar to a vectorized d-heap's memory management, the main goal for a generic vectorized d-heap is to minimize expensive calls to malloc( ) or realloc( ) during the lifetime of the generic vectorized d-heap. Calling these functions too often would otherwise nullify any performance improvements achieved through vectorization.

As discussed previously, each of the suffix d-heaps represented as a single vectorized heap of the generic vectorized heap requires individual continuous memory, which grows and shrinks during the lifetime of the generic vectorized heap. The vectorized heap uses the exponential growing strategy, which provides a good trade-off between the number of calls to malloc( ) or realloc( ) and the amount of unused memory in each suffix d-heap. However, the number of calls in the generic vectorized heap is still much higher than in a single heap because each of the generic vectorized heaps grows independently.

To illustrate this issue, consider the following scenario where 128 key values should be inserted into a vectorized 8-heap and a generic vectorized heap that has multiple suffix 8-heaps, respectively. Assume the heaps grow dynamically and are not initialized with a heap array with a size of 128. A single vectorized heap would call malloc( ) once to allocate an initial heap array and then double the initial heap array using realloc( ) four times from 8 to 128 to store all 128 key values. For the generic vectorized heap, the number of allocations depends on the number suffix d-heaps. If the generic vectorized heap has four suffix 8-heaps and the key values are evenly distributed among these suffix d-heaps, then four malloc( ) calls are needed to allocate the initial heap array for all four suffix d-heaps and each of the suffix d-heaps' heap array is doubled three times from 8 to 32 until all 128 key values fit in the generic vectorized heap. Hence, the generic vectorized heap requires in total 16 calls to malloc( )/realloc( ) instead of 5 calls needed by the single vectorized heap. In general, the number of calls to malloc( )/realloc( ) in a generic vectorized heap depends on the number of suffix d-heaps and the distribution of the key values. The number of allocations is higher the more suffix d-heaps the heap has and the closer the key value distribution resembles a uniform distribution.

The number of resize operations of the suffix d-heaps' heap arrays cannot be reduced without employing an allocation strategy that leads to significantly larger portions of unused memory, e.g., a strategy that would initially allocate 4 KB for each suffix d-heap would lead to fewer calls to realloc( ) but increase the memory footprint by more than two orders of magnitude when compared to the exponential growing strategy. A solution is to employ the exponential growing strategy for the suffix d-heap's heap arrays and reduce calls to realloc( ) via a custom memory allocator.

A key observation is that as the generic vectorized heap grows, the heap repeatedly allocates and reallocates arrays of a size that it has previously freed with a call to realloc( ) or free( ). For example, if a suffix 8-heap that had an initial heap array of size 8 grows beyond 8 key values, the heap frees the size-8 array and allocates a size-16 array. If a suffix 8-heap is created later on, then a size-8 array is allocated for the new suffix d-heap. If the size-8 array that was freed during the resize of the first suffix d-heap would have been kept, then one allocation would have been avoided. A custom memory allocator that avoids exactly such allocations may be utilized by 1) keeping allocated memory that would otherwise be freed in a realloc( ) call and 2) handing out such memory when creating or resizing heap arrays.

A custom allocator may replace the standard allocator. The customer allocator may borrow functionality from the standard allocation such as internally calling the standard allocator's malloc and free methods. The key idea is that memory chunks are kept that were previously used by a suffix d-heap but would have been freed when the suffix d-heap was growing or shrinking. In total 8 lists are kept, each holding unused memory chunks of a certain size. For example, the first list holds 16-bytes memory chunks, the second list holds 32-bytes memory chunks and so on. The last list holds 2048-byte chunks. Lists for larger chunks are not kept since 1) these sizes are rarely needed and 2) as soon as the page size (4096 bytes) is reached, large memory chunks of 128K are allocated and the operating system's virtual memory management assigns increments of 4K pages as needed. The memory chunks in the lists are connected via pointers that are stored in the first few bytes of chunks themselves.

The custom allocator then functions as follows: If a suffix d-heap doubles in size from s to 2 s, then the allocator checks if there is a chunk of size 2 s available. If a chunk of size 2 s is available, the chunk is dequeued from the list holding size-2 s chunks and passed to the suffix d-heap. Otherwise, a new size-2 s chunk is allocated using the standard memory allocator. After the suffix d-heap has copied the suffixes from the size-s chunk to the size-2 s chunk, the now unused size-s chunk is enqueued into the list holding chunks of size-s. Shrinking of suffix d-heaps works analogously. To avoid collecting too much unused memory, memory chunks are freed in lists where the list size reaches a certain threshold. These techniques result in a significant reduction of malloc and free calls.

Fast Key Lookups

Key lookups to search given key values in the heap are used in various algorithms (e.g., dynamic programming) to avoid storing duplicate key values in the heap or to return the payload of an indexed key value. There are two types of key lookups: has_key and payload lookups. The former type of lookup checks if a given key value is indexed in the heap while the latter returns the payload for a given key value. The prefix hash table of the generic vectorized heap can be exploited for fast key lookups. The prefix hash table allows a quick reduction of the search space, i.e., per constant time hash-table lookup, based on the prefix of a key value. The suffix of the key value still needs to be searched in the suffix array that was returned by the hash-table lookup and shares the prefix with key value being searched. Since a suffix array will likely only have a few hundred entries, it is sufficient to use linear search for the suffix lookup. SIMD compare instructions may also be used to speed up such a search.

Existing heap implementations can be enhanced with a hash table to provide similarly fast lookups. However, the generic vectorized heap can reuse prefix hash tables, which is also likely multiple orders of magnitude smaller than an extra hash-table that indexes each key value as the respective heap that the hash table is stored along with. The cheap lookup in the small prefix hash table as well as the low-cost vectorized search in the suffix array are faster than a single lookup in a large hash-table that stores all of the heap's key values.

TABLE 1

Code snippet for the vectorized has_key( ) method.

```
bool GenericHeap::has_key(Key &key) {
  auto iter = prefixTable.find(key.prefix( ));
  if (iter != prefixTable.end( )) {
    int cmpvec = _mm256_set1_epi16(key.suffix( ));
    int dwords = iter->nelem / 16 + (iter->nelem & 0x15 ? 1 : 0);
    for (int i = 0; i < dwords; i++) {
      auto res = _mm256_cmpeq_epi16(cmpvec, iter->data[i]);
      if (_mm256_movemask_epi8(res)) {
        return true;
      }
    }
  }
  return false;
}
```

TABLE 1 illustrates the code for a has_key( ) lookup method. The method takes a key value as input and returns true if the key value is indexed in the heap and otherwise false. The actual lookup is performed in two steps: 1) the prefix hash table 'prefixTable' is probed with the prefix of the given key 'key'. If the hash table contains the prefix, then 2) the key's suffix is searched in the suffix array. A single loop iterates over all elements of the suffix array to search for the suffix. Before iterating over the loop, the suffix being searched is replicated to all elements of a vector 'cmpvec'. The comparison of the replicated suffix stored in 'cmpvec' and, in each iteration of the loop, 16 elements of the suffix array is performed using '_mm256_cmpeq_epi16' (or similar 16-bit SIMD element-wise compare instructions). The instruction returns a new vector containing 16 results, i.e., one result for each of the 16 element-wise comparisons. Finally, the '_mm256_movemask_epi8' instruction is used to check if one of the elements in the result vector is true. If the instruction yields a value other than zero, then the key value was found and the has_key( ) method returns true. In all other cases, the method returns false.

A payload lookup method is implemented in a similar fashion. The main difference is that multiple payloads might be returned for the same key in case key duplicates are allowed in the heap. Furthermore, the positions of the suffixes that match the suffix of the key being searched must be calculated in order to return the payloads. The '_mm256_movemask_epi8' instruction in combination with a count-leading zero instruction is used to obtain the position of the elements that are true in the result vector 'cmpvec', i.e., the vector produced by the '_mm256_cmpeq_epi16' compare instruction during the linear search though the suffix array.

Software Overview

Figure 5:
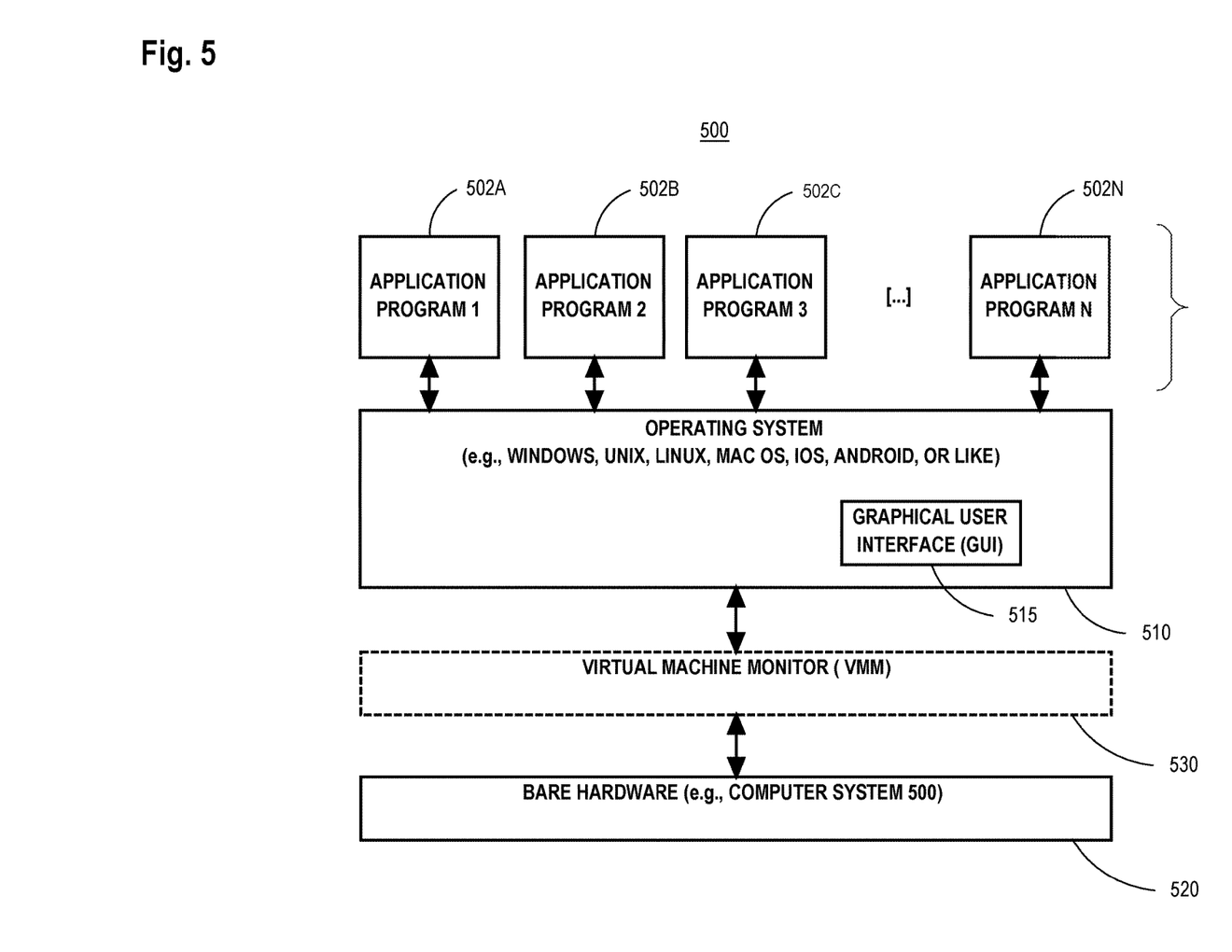
FIG. 5 is a diagram depicting a software system upon which an embodiment of the invention may be implemented.
Figure 6:
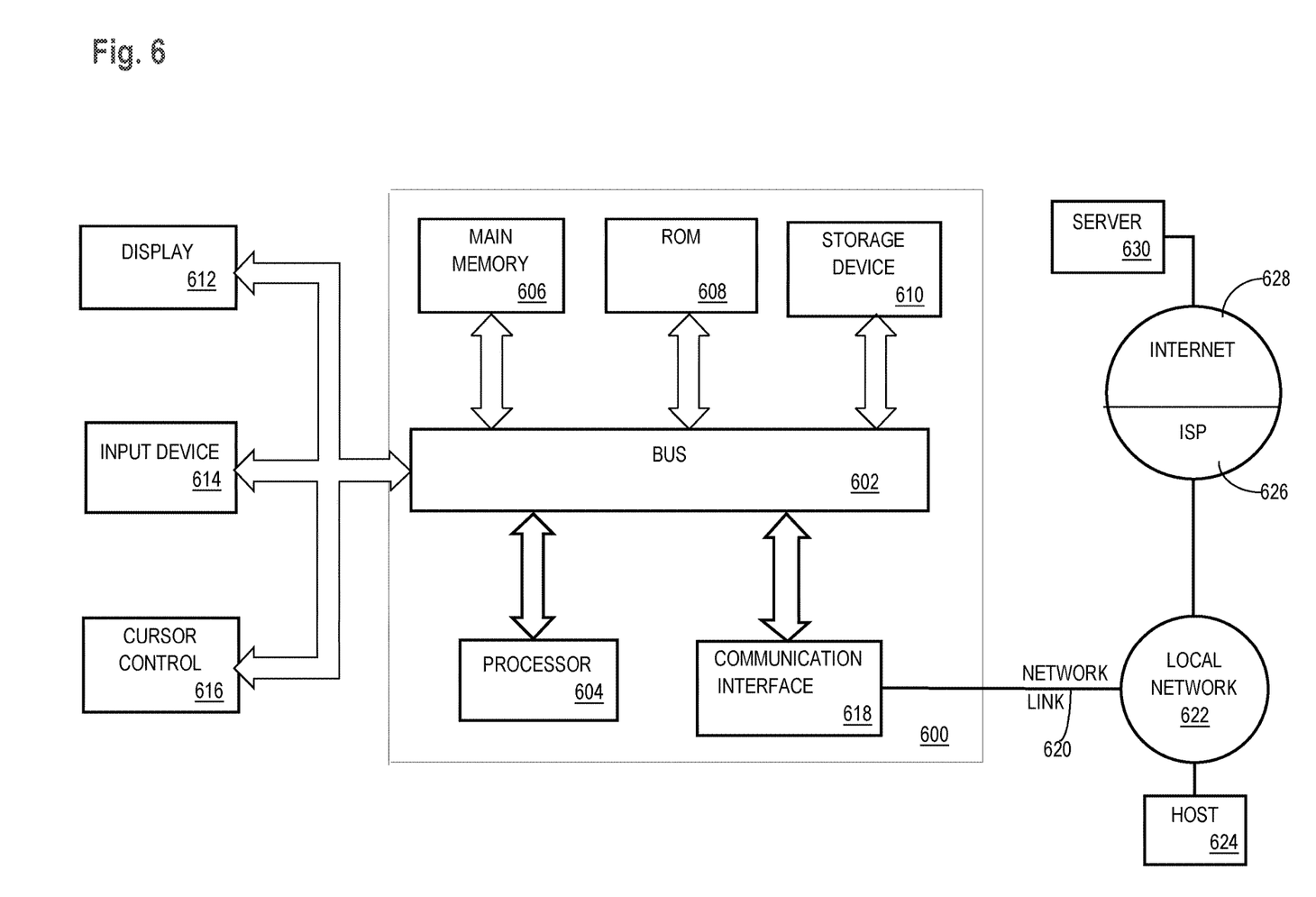
FIG. 6 is a diagram depicting a computer system that may be used in an embodiment of the present invention.

FIG. 5 is a block diagram of a software system 500 that may be employed for controlling the operation of computer system 600. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 600. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 600. The applications or other software intended for use on system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method for maintaining a plurality of key values in memory comprising:
storing a composite heap in a memory, the composite heap comprising a prefix heap and a plurality of suffix heaps;
wherein each entry in the prefix heap includes:
(a) an identified key prefix value of the plurality of key values, and
(b) a reference to a corresponding suffix heap, of the plurality of suffix heaps, that includes all key suffix values of the plurality of key values that share the identified key prefix value;

wherein each suffix heap of said suffix heaps corresponds to a corresponding key prefix value and comprises a plurality of nodes, wherein for said each suffix heap:
  each node of said plurality of nodes comprises D slots, D being a whole number greater than one, wherein each slot of said D slots stores a key suffix value of D key suffix values, wherein the D key suffix values include all key suffix values, of the plurality of key values, that share the corresponding key prefix value, and
  said plurality of nodes includes a root node and a plurality of parent nodes, each parent node of said plurality of nodes having D child nodes, each child node of said D child nodes being a child of a respective parent slot in said each parent node and storing a key suffix value greater than a key suffix value stored in said respective parent slot;
performing a push operation on the composite heap to add a particular key value into the composite heap comprising:
  extracting a particular key prefix value from the particular key value;
  extracting a particular key suffix value from the particular key value; and
  identifying a particular entry in the prefix heap that includes the particular key prefix value and a reference to a particular suffix heap of the plurality of suffix heaps; and
  based on said identifying the particular entry, inserting the particular key suffix value into the particular suffix heap.

2. The method of claim 1, wherein the D slots of each node, of said plurality of nodes, are stored contiguously within a memory address space of said memory.

3. The method of claim 1, further comprising:
storing a prefix hash table in said memory;
wherein said prefix hash table includes a key prefix value for each suffix heap of said plurality of suffix heaps, each key prefix value referencing a respective suffix heap of said plurality of suffix heaps through a hash function.

4. The method of claim 1, further comprising:
performing a top operation on the composite heap;
wherein performing a top operation on a composite heap includes:
  performing a first operation on the prefix heap to obtain a first key prefix value and a first reference to a first suffix heap of the plurality of suffix heaps;
  using the first reference, performing a second operation on the first suffix heap to identify a first minimum key suffix value;
  concatenating the first key prefix value and the first minimum key suffix value and returning the concatenated value.

5. The method of claim 1, further comprising:
performing a pop operation on the composite heap;
wherein performing a pop operation on a composite heap includes:
  performing a first operation on the prefix heap to obtain a first key prefix value and a first reference to a first suffix heap of the plurality of suffix heaps;
  using the first reference, performing a second operation on the first suffix heap to remove a first minimum key suffix value.

6. The method of claim 5, wherein performing the second operation on the suffix heap to remove the first minimum key suffix value comprises:

performing a single instruction multiple data (SIMD) operation on said root node of the first suffix heap to generate the first minimum key suffix value and a first index of a first slot in the root node of the first suffix heap that holds said first minimum key suffix value;
copying a value in the first suffix heap into said first slot.

7. The method of claim 1, wherein:
each suffix heap of the plurality of suffix heaps is stored in a respective array of a plurality of arrays,
each respective array, of the plurality of arrays, comprises a plurality of heap levels, wherein a first heap level of the plurality of heap levels stores said root node, wherein each particular heap level of said plurality of heap levels after said first heap level stores contiguously with an address space of said memory all child nodes of the heap level of said plurality of heap level previous to said each particular heap level.

8. The method of claim 7, wherein:
each element of each respective array, of the plurality of arrays, corresponds to one respective slot in the plurality of nodes of the respective suffix heap;
each payload element of a payload array corresponds to one element of the respective array and to the one respective slot in said plurality of nodes of the respective suffix heap that corresponds to said one element of the respective array.

9. The method of claim 1, wherein each reference to corresponding suffix heap comprises a pointer to a memory address storing the corresponding suffix heap of the plurality of suffix heaps.

10. One or more non-transitory computer-readable media storing instructions which, when executed by one or more processors, cause:
storing a composite heap in a memory, the composite heap comprising a prefix heap and a plurality of suffix heaps;
wherein each entry in the prefix heap includes:
  (a) an identified key prefix value of a plurality of key values, and
  (b) a reference to a corresponding suffix heap, of the plurality of suffix heaps, that includes all key suffix values of the plurality of key values that share the identified key prefix value;
wherein each suffix heap of said suffix heaps corresponds to a corresponding key prefix value and comprises a plurality of nodes, wherein for said each suffix heap:
  each node of said plurality of nodes comprises D slots, D being a whole number greater than one, wherein each slot of said D slots stores a key suffix value of D key suffix values, wherein the D key suffix values include all key suffix values of the plurality of key values, that share the corresponding key prefix value, and
  said plurality of nodes includes a root node and a plurality of parent nodes, each parent node of said plurality of nodes having D child nodes, each child node of said D child nodes being a child of a respective parent slot in said each parent node and storing a key suffix value greater than a key suffix value stored in said respective parent slot;
performing a push operation on the composite heap to add a particular key value into the composite heap comprising:
  extracting a particular key prefix value from the particular key value;
  extracting a particular key suffix value from the particular key value; and identifying a particular entry in the prefix heap that includes the particular key prefix value and a reference to a particular suffix heap of the plurality of suffix heaps; and based on said identifying the particular entry, inserting the particular key suffix value into the particular suffix heap.

11. The one or more non-transitory computer-readable media of claim 10, wherein the D slots of each node, of said plurality of nodes, are stored contiguously within a memory address space of said memory.

12. The one or more non-transitory computer-readable media of claim 10, further comprising instructions which, when executed by one or more processors, cause:

storing a prefix hash table in said memory;

wherein said prefix hash table includes a key prefix value for each suffix heap of said plurality of suffix heaps, each key prefix value referencing a respective suffix heap of said plurality of suffix heaps through a hash function.

13. The one or more non-transitory computer-readable media of claim 10, further comprising instructions which, when executed by one or more processors, cause:

performing a top operation on the composite heap;

wherein performing a top operation on a composite heap includes:

performing a first operation on the prefix heap to obtain a first key prefix value and a first reference to a first suffix heap of the plurality of suffix heaps;

using the first reference, performing a second operation on the first suffix heap to identify a first minimum key suffix value;

concatenating the first key prefix value and the first minimum key suffix value and returning the concatenated value.

14. The one or more non-transitory computer-readable media of claim 10, further comprising instructions which, when executed by one or more processors, cause:

performing a pop operation on the composite heap;

wherein performing a pop operation on a composite heap includes:

performing a first operation on the prefix heap to obtain a first key prefix value and a first reference to a first suffix heap of the plurality of suffix heaps;

using the first reference, performing a second operation on the first suffix heap to remove a first minimum key suffix value.

15. The one or more non-transitory computer-readable media of claim 14, wherein performing the second operation on the suffix heap to remove the first minimum key suffix value comprises:

performing a single instruction multiple data (SIMD) operation on said root node of the first suffix heap to generate the first minimum key suffix value and a first index of a first slot in the root node of the first suffix heap that holds said first minimum key suffix value;

copying a value in the first suffix heap into said first slot.

16. The one or more non-transitory computer-readable media of claim 10, wherein:

each suffix heap of the plurality of suffix heaps is stored in a respective array of a plurality of arrays, each respective array, of the plurality of arrays, comprises a plurality of heap levels, wherein a first heap level of the plurality of heap levels stores said root node, wherein each particular heap level of said plurality of heap levels after said first heap level stores contiguously with an address space of said memory all child nodes of the heap level of said plurality of heap level previous to said each particular heap level.

17. The one or more non-transitory computer-readable media of claim 16, wherein:

each element of each respective array, of the plurality of arrays, corresponds to one respective slot in the plurality of nodes of the respective suffix heap;

each payload element of a payload array corresponds to one element of the respective array and to the one respective slot in said plurality of nodes of the respective suffix heap that corresponds to said one element of the respective array.

18. The one or more non-transitory computer-readable media of claim 10, wherein each reference to a corresponding suffix heap comprises a pointer to a memory address storing the corresponding suffix heap of the plurality of suffix heaps.

* * * * *

UNITED STATES PATENT AND TRADEMARK OFFICE
CERTIFICATE OF CORRECTION

| | |
|---|---|
| PATENT NO. | : 11,379,232 B2 |
| APPLICATION NO. | : 16/399226 |
| DATED | : July 5, 2022 |
| INVENTOR(S) | : Schlegel et al. |

It is certified that error appears in the above-identified patent and that said Letters Patent is hereby corrected as shown below:

In the Claims

In Column 18, Line 1, in Claim 6, delete "(SIMD" and insert -- (SIMD) --, therefor.

In Column 18, Line 28, in Claim 9, delete "to" and insert -- to a --, therefor.

In Column 18, Line 51, in Claim 10, delete "values" and insert -- values, --, therefor.

Signed and Sealed this
Tenth Day of January, 2023

Katherine Kelly Vidal
*Director of the United States Patent and Trademark Office*